United States Patent Office 3,639,557
Patented Feb. 1, 1972

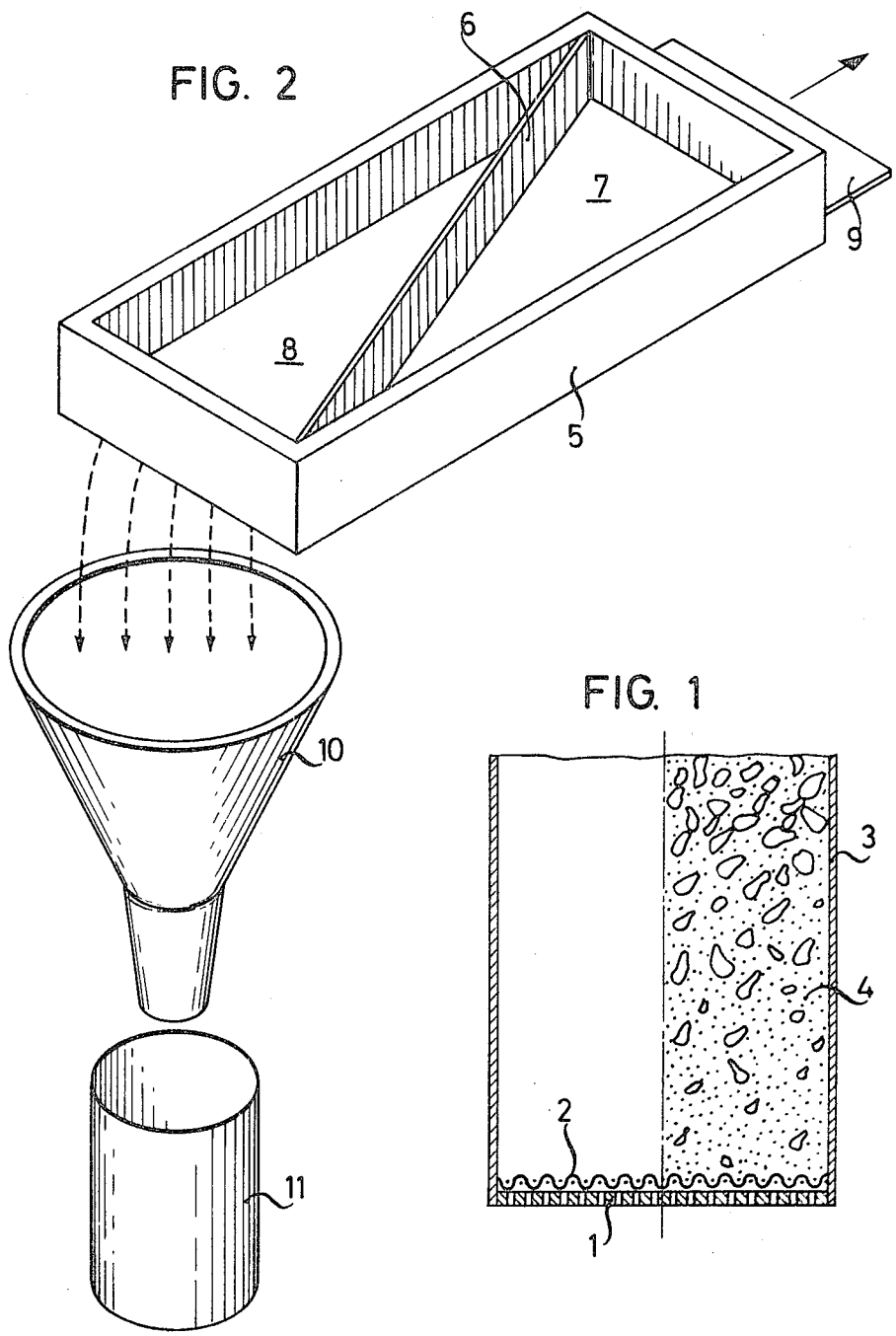

3,639,557
PROCESS AND DEVICE FOR FILTERING MELTS OF FIBER-FORMING HIGH MOLECULAR WEIGHT POLYMERS
Otto Pfannenschmid, Bobingen, Germany, assignor to Farbwerke Hoechst Aktiengesellschaft vormals Meister Lucius & Bruning, Frankfurt am Main, Germany
Filed Apr. 1, 1970, Ser. No. 24,729
Claims priority, application Germany, Apr. 12, 1969, P 19 18 686.8
Int. Cl. B28b 3/20; D01d 1/10
U.S. Cl. 264—176                          8 Claims

ABSTRACT OF THE DISCLOSURE

To remove impurities and inhomogeneities from spinning masses of fiber- and film-forming high molecular weight polymers the masses are filtered through a filter pack containing a finely divided material which is inert towards the spinning mass and the mean fineness of grain of which increases in the direction to the spinneret according to an exponential function.

---

The present invention relates to a process and device for filtering melts of fiber-forming molecular weight polymers.

Impurities and inhomogeneities in melts or spinning solutions of high molecular weight polymers disturb the spinning process and impair the quality of the spun products. Attempts are, therefore, being made to remove such impurities by a filtering process before the melt or solution reaches the spinneret. For this purpose a combination of sieves is used consisting of varying number of sieves of different construction and varying mesh size. Besides, so-called sand packs are used, either alone or in combination with the aforesaid sieve packs, which sand packs may consist of the most different materials of different volume and granulations. It has also been proposed to use successive layers of filter materials of varying particle size (cf. U.S. Pat. 2,266,368 and U.S. Pat. 3,074,104). The aforesaid processes have the drawback that owing to an irregular utilization of the filter material, the filter packs must be exchanged after a relatively short period of time as the increase in pressure in the device is too high or the filtering effect diminishes. When several types of sand are arranged in layers in a manner such that the melt successively passes first the layers of coarse sand, then the layers of fine sand and, if desired, finally again layers of coarser sand, the aforesaid disadvantageous effects can be weakened, but to an insufficient extent only, since the impurities preferably accumulate in a thin layer near the interface to the layer of sand of the next finer degree of granulation.

The present invention provides a process for filtering fiber- and film-forming high molecular weight polymers through a packing of finely divided material, which comprises passing the spinning mass of the polymer through a packing of finely divided material which is inert towards the spinning mass and the mean fineness of grain of which continuously increases in the packing in the direction of flow of the spinning mass.

The process of the invention is suitable for all polymers of high molecular weight that can be spun from a solution or from a melt, such as polyacrylonitrile, nylon 3, polyesters, copolyesters, polyamides, copolyamides, polyester amides, polyolefins, polyvinyl chloride and the like, preferably polyacrylonitrile, polyethylene terephthalate and the copolyesters thereof, poly[ε-amino-caprolactam] and poly[hexamethylene adipic acid amide] and the copolyamides thereof. Before they reach the orifices of the spinneret the spinning masses of the film- and fiber-forming high molecular weight polymer are forced through a packing of a finely divided material which is inert towards the spinning masses. A great number of inert substances can be used, silicon carbide, quartz sand and corundum being preferred.

The fineness of grain of the material used for the filter pack can vary within a wide range, preferably in a range of from 24 to 72 according to the standards of the American Society of Testing Materials (ASTM). It is likewise possible, however, to use a coarser or finer granulation. In the filter pack the material which is inert towards the spinning mass is arranged in such a manner that its mean fineness of grain continuously increases in the direction of flow of the spinning mass. By the mean fineness of grain there is meant the arithmetic mean of the diameter of the particles of the inert material.

The invention is now described with reference to the accompanying drawings in which:

FIG. 1 represents a sectional view of a filter pack according to the invention. Numeral 1 is the plate of the spinneret, numeral 2 designates a sieve plate, numeral 3 is the wall of the filter pack and numeral 4 the filter material.

To obtain a filter pack in which the mean fineness of grain continuously increases in the direction of flow of the spinning mass, a device as shown in FIG. 2 is preferably used.

The device consists of a flat box 5 divided into two sections 7 and 8 by a separating plate 6. The bottom of base plate 9 can be removed in the direction of the arrow, for example by means of a spindle and motor with given speed. When the bottom plate is removed in the direction of the arrow, the sand falling down initially contains a high proportion of the component of section 8 which diminishes more and more until finally almost exclusively the component of section 7 falls down when the bottom plate 9 is nearly removed. The flow-out device is represented by a funnel 10 through which the sand flows into the filter pack. If a better mixing of the sand is desired, the funnel can be replaced by a device with baffle plates or the like. In the filter pack the formation of a slope should be avoided in order to prevent the components from demixing. For this purpose, the filter pack can be moved in suitable manner, for example on a slide and/or rotating table.

The drawing and the description of the device are only given by way of example and do not limit the invention.

It is also possible, for example, to use a box in which the separating plate does not reach from one edge to the other or to combine a plurality of separating plates. The depth of the box is only limited by the fact that the filter material generally forms an angle of slope when flowing out, which angle is of minor importance with a flat box. The formation of the angle of slope can also be avoided by different means.

A special advantage of the simple mode of execution of the device resides in the fact that by using a separating plate of suitable shape, not only a linear modification of the mixing proportion can be obtained, but also other modifications, preferably exponential modifications. A modification in exponential form is preferred because the density of the particles removed from the spinning mass and retained in the filter pack often follows a negative exponential function $\rho(x) = \rho_0(t) \cdot e^{-x}$, in which $\rho(x)$ is the density of the particles retained in the filter at the distance $x$ from the upper surface of the filter pack and $\rho_0(t)$ is the basic density of the retained particles which only changes in dependence on the time, and $x$ stands for the depth of the filter pack in the direction of flow of the spinning mass. For the sake of simplicity, the function is established on the generally incorrect assumption that the particles retained in the filter are of equal size or at least the size varies within narrow limits.

When a constant occupancy of the filter pack is to be obtained over the filter depth, which occupancy generally depends on the time, a filter material is used the mean fineness of grain of which is calculated by multiplying $p(x)$ with a positive exponential function $w = w_0 \cdot e^x$, in which $w$ is the probability that a particle is retained in the filter pack on a distance $x$, $w_0$ is a constant and $e$ the basis of the natural logarithms, $x$ being the depth of the filter in the direction of flow of the spinning mass, according to which exponential function the effectiveness of the filter is varied over the filter depth. This effectiveness as a probability for a particle to be retained in a definite layer of the thickness $dx$ can be adjusted by the mean fineness of the particles of the filter material. The device described above permits of adjusting the mean fineness over the distance $x$ in almost any desired manner.

The fineness of grain of the filter material in the packing can continuously diminish in a varying degree. For example, the fineness of grain of the inert filter material can linearly increase over the entire thickness of the filter pack, preferably however it increases according to an exponential function $k \cdot e^{+x}$, in which $k$ is a constant given by the size of the filter material at the beginning of the packing i.e. when the thickness of the filter is zero, $e$ is the basis of the natural logarithms and $x$ the growing thickness of the filter pack, measured from the entry of the spinning mass into the filter pack.

The spinning mass which still contains impurities and inhomogeneities, originating, for example, from an incomplete dissolution or melting, first passes the coarse-grained particles of the filter material, whereby the coarser impurities are removed. The further the spinning mass, for example a polymer melt, passes through the filter pack, the higher the degree of fine-grained impurities that are retained between the filter grains of continuously diminishing size.

Comparative tests revealed that on spinning textile filaments $d$ tex 150 $f$ 50 a filter pack according to the invention could be used for a period of time that was by up to 50% longer than that of a conventional filter pack because the increase in pressure due to clogging of the filter was so much slower. Similar results were obtained when mono filaments were spun. In this case the period of service of the filter pack according to the invention could be increased by 50 to 100% while simultaneously the formation of disturbing thickenings, i.e. sections in which the normal diameter of the monofil is exceeded by more than 60%, was reduced by the factor 3. In the tests, the types of sand had the grain sizes hitherto used. In the filter pack according to the invention, instead of arranging the sand in horizontal layers, the grain size continuously diminished. The mixing device used was provided with a straight diagonal separating plate.

What is claimed is:
1. A process for filtering spinning masses of fiber- or film-forming high molecular weight polymers by filtering the mass, prior to spinning, through a packing of finely divided material which comprises passing the spinning mass through a filter pack consisting of a finely divided material which is inert towards the spinning mass and the fineness of grain of which continuously increases in the direction of flow of the spinning mass.

2. The process of claim 1, wherein the packing consists of an inert material of at least two grades of fineness of grain, the mixing proportion of which continuously changes within the packing in a manner such that the mean fineness of grain continuously increases in the direction of flow of the spinning mass.

3. The process of claim 1, wherein the mean fineness of grain of the inert material in the packing increases in the direction of flow of the spinning mass according to an exponential function $k \cdot e^{+x}$, in which $k$ is a constant, $e$ is the basis of the natural logarithms and $x$ is the thickness of the filter pack measured from the entry of the spinning mass into the inert filter material.

4. The process of claim 1, which comprises using granular silicon carbide as finely divided inert material.

5. The process of claim 1, wherein a molten high molecular weight polymer is filtered.

6. A filter pack for filtering a spinning mass of a fiber- or film-forming high molecular weight polymer comprising a plate of a spinneret and a packing of a finely divided material which is inert towards the spinning mass and the fineness of grain of which continuously increases in the direction to the plate of the spinneret.

7. A filter pack as claimed in claim 6, wherein the fineness of grain of the filter material increases in the direction of flow of the spinning mass according to an exponential function $k \cdot e^x$ in which $k$ is a constant, $e$ is the basis of the natural logarithms and $x$ the increasing thickness of the filter pack measured from the entry of the spinning mass into the inert filter material.

8. A filter pack as claimed in claim 6, containing finely divided silicon carbide as filter material.

References Cited
UNITED STATES PATENTS

| | | | |
|---|---|---|---|
| 2,266,363 | 12/1941 | Graves | 18—8 SF |
| 2,266,368 | 12/1941 | Hull et al. | 18—8 SF |
| 2,474,885 | 7/1949 | Blomquist | 18—8 SF |
| 2,883,261 | 4/1959 | McGeorge | 264—176 F |
| 3,104,419 | 9/1963 | La Forge | 18—8 SF |
| 3,307,216 | 3/1967 | Dunn et al. | 18—8 SF |
| 3,457,342 | 7/1969 | Parr et al. | 18—8 SF |

JAY H. WOO, Primary Examiner

U.S. Cl. X.R.
18—8 SF; 210—263